US009807024B2

(12) United States Patent
Shpiner et al.

(10) Patent No.: US 9,807,024 B2
(45) Date of Patent: Oct. 31, 2017

(54) MANAGEMENT OF DATA TRANSMISSION LIMITS FOR CONGESTION CONTROL

(71) Applicant: Mellanox Technologies Ltd., Yokneam (IL)

(72) Inventors: Alexander Shpiner, Nesher (IL); Eitan Zahavi, Zichron Yaakov (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 47 days.

(21) Appl. No.: 14/730,257

(22) Filed: Jun. 4, 2015

(65) Prior Publication Data

US 2016/0359758 A1    Dec. 8, 2016

(51) Int. Cl.
*H04L 12/823*    (2013.01)
*H04L 12/803*    (2013.01)
*H04L 12/825*    (2013.01)
*H04L 12/841*    (2013.01)
*H04L 12/26*    (2006.01)

(52) U.S. Cl.
CPC ............ *H04L 47/32* (2013.01); *H04L 47/122* (2013.01); *H04L 47/263* (2013.01); *H04L 47/28* (2013.01); *H04L 43/0894* (2013.01); *Y02B 60/31* (2013.01)

(58) Field of Classification Search
None
See application file for complete search history.

(56) References Cited

U.S. PATENT DOCUMENTS 5,400,329 A     3/1995  Tokura et al.
5,442,624 A *   8/1995  Bonomi ............. H04L 12/5602
                                                    370/231
5,463,620 A *   10/1995 Sriram .................... H04J 3/247
                                                    370/229
5,751,969 A *   5/1998  Kapoor .............. H04Q 11/0478
                                                    370/235
6,188,671 B1 *  2/2001  Chase .................. H04L 12/4608
                                                    370/232
6,724,721 B1    4/2004  Cheriton
6,859,435 B1    2/2005  Lee et al.
6,980,520 B1 *  12/2005 Erimli ...................... H04L 47/10
                                                    370/236

(Continued)

FOREIGN PATENT DOCUMENTS

EP       2068511 A1      6/2009
WO    2009046869 A1      4/2009

OTHER PUBLICATIONS

IEEE Standard 802.1Qau for Local and metropolitan area networks—"Virtual Bridged Local Area Networks", Amendment 13: Congestion Notification, pp. 1-135, Apr. 23, 2010.

(Continued)

*Primary Examiner* — Donald Mills
(74) *Attorney, Agent, or Firm* — D.Kligler IP Services Ltd.

(57) ABSTRACT

A method for communication includes transmitting data packets from a communication device to a network. Upon receiving in the communication device a congestion notification from the network, a rate of transmission of the data packets from the communication device to the network is reduced. While transmitting the data packets, after reducing the rate of transmission, the rate of transmission is increased incrementally when a predefined volume of data has been transmitted since having made a previous change in the rate of transmission.

22 Claims, 3 Drawing Sheets

(56) References Cited

U.S. PATENT DOCUMENTS

| | | | |
|---|---|---|---|
| 7,000,025 B1* | 2/2006 | Wilson | H04L 47/10 709/226 |
| 7,061,868 B1* | 6/2006 | Ahlfors | H04L 47/10 370/236 |
| 7,200,116 B2 | 4/2007 | Kobayashi | |
| 7,573,827 B2 | 8/2009 | Santos et al. | |
| 7,602,712 B2 | 10/2009 | Johnsen et al. | |
| 7,706,255 B1 | 4/2010 | Kondrat et al. | |
| 7,830,889 B1 | 11/2010 | Lemaire et al. | |
| 7,839,779 B2 | 11/2010 | Singla et al. | |
| 8,174,978 B2 | 5/2012 | Naven et al. | |
| 8,201,168 B2 | 6/2012 | Haviv et al. | |
| 8,345,548 B2 | 1/2013 | Gusat et al. | |
| 8,379,515 B1* | 2/2013 | Mukerji | H04L 47/323 370/229 |
| 8,391,144 B1 | 3/2013 | Pannell et al. | |
| 8,705,349 B2 | 4/2014 | Bloch et al. | |
| 8,811,183 B1 | 8/2014 | Anand et al. | |
| 8,867,356 B2 | 10/2014 | Bloch et al. | |
| 2003/0026267 A1 | 2/2003 | Oberman et al. | |
| 2004/0202169 A1* | 10/2004 | Mukouyama | H04L 12/5601 370/395.1 |
| 2006/0045089 A1 | 3/2006 | Bacher et al. | |
| 2006/0088036 A1 | 4/2006 | De Prezzo | |
| 2006/0156164 A1 | 7/2006 | Meyer et al. | |
| 2008/0056125 A1 | 3/2008 | Kneckt et al. | |
| 2008/0075003 A1 | 3/2008 | Lee et al. | |
| 2008/0232251 A1 | 9/2008 | Hirayama et al. | |
| 2008/0304413 A1 | 12/2008 | Briscoe et al. | |
| 2009/0086637 A1* | 4/2009 | DeCusatis | H04L 47/10 370/236.1 |
| 2009/0178037 A1 | 7/2009 | Winter et al. | |
| 2010/0027420 A1 | 2/2010 | Smith | |
| 2010/0088437 A1 | 4/2010 | Zahavi | |
| 2011/0032819 A1 | 2/2011 | Schliwa-Bertling et al. | |
| 2011/0242973 A1 | 10/2011 | Ge et al. | |
| 2012/0155276 A1 | 6/2012 | Vasseur et al. | |
| 2012/0195200 A1 | 8/2012 | Regan | |
| 2013/0003538 A1 | 1/2013 | Greenberg et al. | |
| 2013/0289926 A1 | 10/2013 | Maity et al. | |
| 2014/0064082 A1 | 3/2014 | Yeung et al. | |
| 2014/0185616 A1 | 7/2014 | Bloch et al. | |
| 2014/0269301 A1 | 9/2014 | Rungta et al. | |
| 2015/0009817 A1* | 1/2015 | Sato | H04L 47/193 370/230.1 |
| 2015/0029853 A1 | 1/2015 | Raindel et al. | |
| 2015/0055478 A1 | 2/2015 | Tabatabaee et al. | |
| 2015/0103667 A1 | 4/2015 | Elias et al. | |
| 2016/0014029 A1 | 1/2016 | Yuan et al. | |

OTHER PUBLICATIONS

Infiniband Trade Association, "Infiniband Architecture Specification", vol. 1, release 1.2.1, Annex A10, pp. 1650-1697, Nov. 2007.

IEEE, 802.3, "Standard for Information technology—Telecommunications and information exchange between systems—Local and metropolitan area networks—Specific requirements" Part 3: Carrier Sense Multiple Access with Collision Detection (CSMA/CD) Access Method and Physical Layer Specifications Corrigendum 1: Timing Considerations for PAUSE Operation, 12 pages, Jan. 2009.

Mahalingam et al, "VXLAN: A Framework for Overlaying Virtualized Layer 2 Networks over Layer 3 Networks", draft-mahalingam-dull-dcops-vxlan-02.txt, Network Working Group, Internet Draft, 20 pages, Aug. 22, 2012.

U.S. Appl. No. 13/304,654 Office Action dated Nov. 6, 2013.

U.S. Appl. No. 13/304,654 Office Action dated Aug. 2, 2013.

Zahavi et al., "On the Relation Between Congestion Control, Switch Arbitration and Fairness," 11th IEEE/ACM International Symposium on Cluster, Cloud and Grid Computing (CCGrid), pp. 23-26, May 2011.

IEEE Standard 802.1Qbb for Local and metropolitan area networks—"Media Access Control (MAC) Bridges and Virtual Bridged Local Area Networks", Amendment 17: Priority-based Flow Control, pp. 1-40, Sep. 30, 2011.

U.S. Appl. No. 13/245,886 Office Action dated Sep. 30, 2013.

IEEE Standard 802.3 for Information technology—"Telecommunications and information exchange between systems", Local and metropolitan area networks, pp. 1-628, Dec. 9, 2005.

U.S. Appl. No. 13/245,886 Office Action dated May 22, 2013.

Chu et al, "Transmission of IP over InfiniBand (IPoIB)", Network Working Group, RFC 4391, 21 pages, Apr. 2006.

Allman et al, "TCP Congestion Control", Network Working Group, RFC 2581, 14 pages, Apr. 1999.

Ramakrishnan et al, "The Addition of Explicit Congestion Notification (ECN) to IP", Network Working Group, RFC 3168, 63 pages, Sep. 2001.

Sridharan et al, "NVGRE: Network Virtualization using Generic Routing Encapsulation", draft-sridharan-virtualization-nvgre-01.txt, Network Working Group , Internet Draft, 17 pages, Jul. 9, 2012.

U.S. Appl. No. 14/052,743 Office Action dated Sep. 29, 2015.

Allman et al., "TCP Congestion Control", Request for Comments (RFC) 5681 of the Internet Engineering Task Force (IETF), 18 pages, Sep. 2009.

U.S. Appl. No. 14/052,743 Office Action dated May 21, 2015.

Jacquet et al., "Re-ECN: Adding Accountability for Causing Congestion to TCP/IP"—draft-briscoe-tsvwg-re-ecn-tcp-09, pp. 1-50, Oct. 25, 2010.

Jiang et al., "Forward Explicit Congestion Forward Explicit Congestion Notification (FECN) for Notification (FECN) for Datacenter Ethernet Networks", IEEE 802.1au Congestion Notification Group Interim Meeting, 60 pages, Mar. 12-15, 2007.

U.S. Appl. No. 14/338,488 Office Action dated Apr. 20, 2016.

U.S. Appl. No. 14/052,743 Office Action dated Mar. 24, 2016.

U.S. Appl. No. 14/052,743 Office Action dated Jan. 12, 2017.

U.S. Appl. No. 14/052,743 Office Action dated Aug. 8, 2018.

\* cited by examiner

MANAGEMENT OF DATA TRANSMISSION LIMITS FOR CONGESTION CONTROL

FIELD OF THE INVENTION

The present invention relates generally to communication networks, and particularly to methods and systems for network congestion control.

BACKGROUND OF THE INVENTION

In data communication networks, network congestion may occur, for example, when a port or queue of a network switch is overloaded with traffic, to the extent that it is unable to transmit data at a rate that keeps up with the incoming data that it is receiving. Techniques that are designed to resolve congestion in data communication networks are referred to as congestion control techniques.

Some communication networks apply congestion control mechanisms to mitigate traffic congestion in the network. For example, congestion control for InfiniBand™ networks is specified in "InfiniBand Architecture Specification Volume 1," release 1.2.1, Annex A10, November, 2007, pages 1650-1697, which is incorporated herein by reference. As another example, congestion control for Ethernet™ networks is specified in IEEE Standard 802.1Qau-2010, entitled "IEEE Standard for Local and Metropolitan Area Networks—Virtual Bridged Local Area Networks; Amendment 13: Congestion Notification," Apr. 23, 2010.

According to the above-mentioned InfiniBand Annex A10, when a switch detects congestion on a given port, it sends a Forward Explicit Congestion Notification (FECN) by setting a predefined FECN bit on a subset of the packets exiting the port. The target channel adapter (which is the InfiniBand term for a network interface controller, or NIC) of the FECN sends a Backward Explicit Congestion Notification (BECN) to the source of the packet (by sending a specific message or marking a BECN bit in a packet sent to the source) in order to notify the source that congestion has occurred. The source of the congested packet reacts by reducing its injection of packets (i.e., transmission of packets) into the network. The injection rate subsequently increases over time, up to a permitted maximum if no further congestion is encountered. Congestion control of this sort is performed on a per-flow basis, wherein a flow may be defined in terms of a queue pair (QP) or service level (SL) on the port in question of the packet source.

In order to implement this sort of packet injection rate control, the channel adapter uses a congestion control table (CCT), as explained in section 2.2 of Annex A10. Each entry in the CCT specifies a different value of an injection rate delay (IRD) that is to be applied to a given flow, wherein the IRD defines the delay between successive packets transmitted in this flow. In other words, if a packet has been sent in the flow, the next packet from the flow will not be scheduled for transmission until at least a certain minimum time—specified by the IRD—has passed, so that the greater the IRD, the smaller the packet injection rate.

The CCT entry to use at any given time in a given flow, and hence the current IRD value, is specified by a CCT index (CCTI). The CCTI is incremented, and hence the injection rate is decreased for a flow, based on the receipt of BECNs. The CCTI is decremented periodically, and thus the injection rate is increased, based on a CCTI timer. When this timer expires, the CCTI for each flow associated with that timer is decremented by one, thus referencing a CCT entry that has a reduced delay value. When the CCTI reaches zero, no injection rate delay is applied to the flow.

SUMMARY

Embodiments of the present invention that are described hereinbelow provide improved congestion control techniques, as well as apparatus implementing such techniques.

There is therefore provided, in accordance with an embodiment of the invention, a method for communication, which includes transmitting data packets from a communication device to a network, and receiving in the communication device a congestion notification from the network. A rate of transmission of the data packets from the communication device to the network is reduced in response to the congestion notification. While transmitting the data packets, after reducing the rate of transmission, the rate of transmission is increased incrementally when a predefined volume of data has been transmitted since having made a previous change in the rate of transmission.

In some embodiments, increasing the rate of transmission includes incrementing the rate of transmission only when a predefined time has passed, in addition to the predefined volume of data having been transmitted, since having made the previous change in the rate of transmission.

In a disclosed embodiment, the communication device includes a channel adapter, and receiving the congestion notification includes receiving a backward explicit congestion notification from a target of the transmitted data packets. Typically, the congestion notification refers to a specified flow of the data packets, among a plurality of flows transmitted by the communication device, and respective rates of transmission of the data packets on all of the plurality of the flows are reduced and increased respectively in accordance with the method.

In a disclosed embodiment, transmitting the data packets includes controlling the rate of transmission of the data packets by specifying a delay between successive packets transmitted by the communication device, such that reducing the rate of transmission includes increasing the specified delay, and increasing the rate of transmission includes decreasing the specified delay. Typically, specifying the delay includes selecting an entry indicated by a pointer in a table of delay values, and increasing the specified delay includes incrementing the pointer in response to the congestion notification, while decreasing the specified delay includes decrementing the pointer when the predefined volume of data has been transmitted.

In some embodiments, transmitting the data packets includes maintaining a count of the volume of data transmitted in the data packets since the previous change in the rate of transmission, and the rate of transmission is increased only after the count has reached a predefined threshold. Typically, maintaining the count includes resetting the count after increasing the rate of transmission, in preparation for a subsequent increase in the rate of transmission when the count has again reached the predefined threshold.

There is also provided, in accordance with an embodiment of the invention, communication apparatus, including a network interface, which is configured to transmit outgoing data packets to a network and receive incoming data packets, including congestion notifications, from the network. Packet processing circuitry is configured, while the outgoing data packets are transmitted through the network interface, to reduce a rate of transmission of the data packets to the network in response to the congestion notifications, and after reducing the rate of transmission, to increase the rate of transmission incrementally when a predefined volume of data has been transmitted since having made a previous change in the rate of transmission.

The present invention will be more fully understood from the following detailed description of the embodiments thereof, taken together with the drawings in which:

DETAILED DESCRIPTION OF EMBODIMENTS

Figure 1:
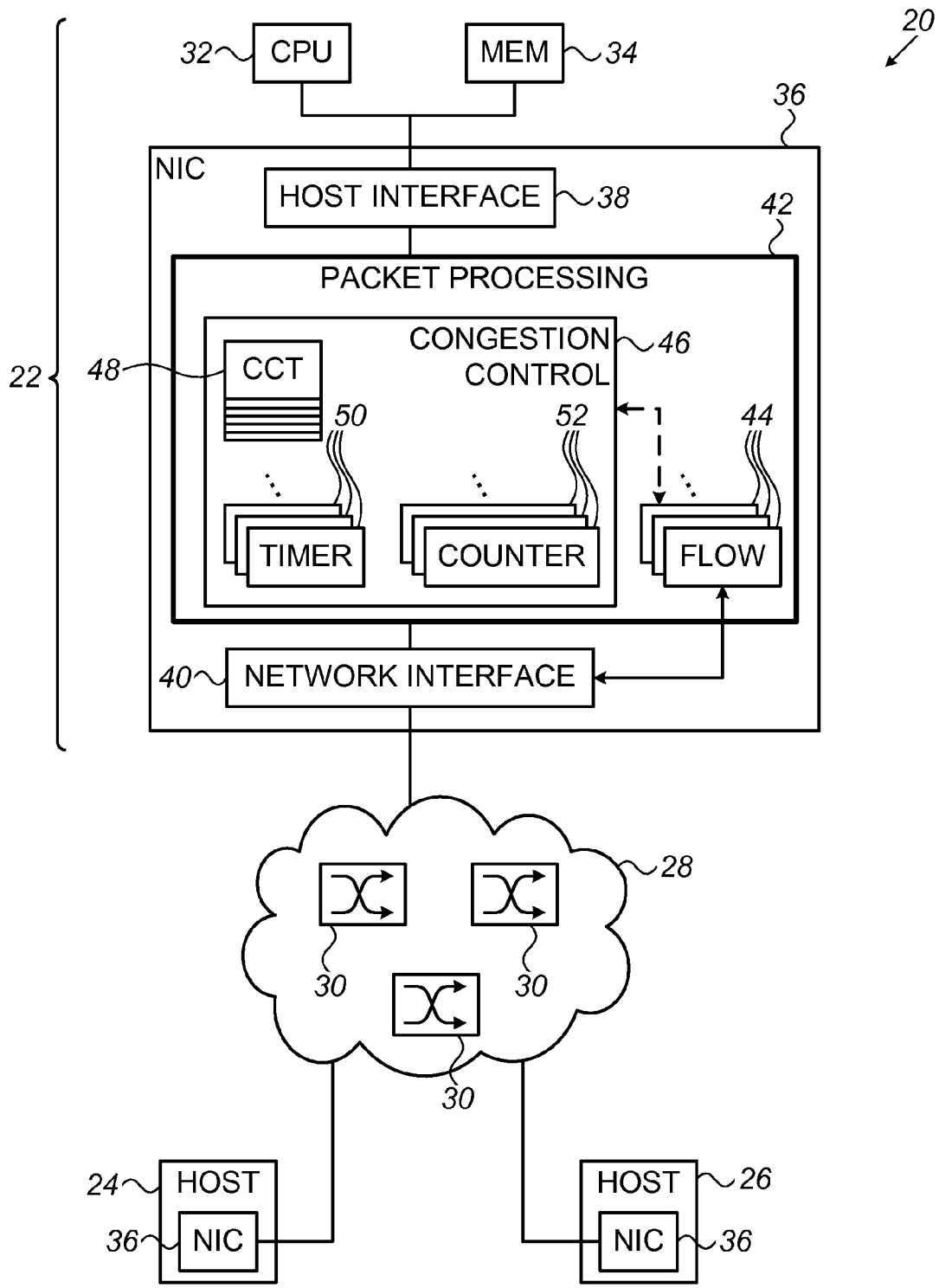
FIG. 1 is block diagram that schematically illustrates a network communication system, in accordance with an embodiment of the invention.

In the conventional InfiniBand congestion control model, as described above, a communication device, such as a NIC, reduces its rate of transmission of data packets to the network upon receiving one or more congestion notifications, such as a BECN. After reducing the rate of transmission, so that the network congestion is able to clear, the device increases its transmission rate gradually over time, with an additional, incremental increase at fixed periods (each time the CCTI timer expires) until the IRD reaches zero. The gradual increase in transmission rate is intended to prevent situations in which a rapid increase in traffic volume causes the congestion to return.

This transmission control model may serve its purpose as long as flows responsible for the congestion are transmitted steadily during the period in which the transmission rate is ramped back up. When flows are bursty, however—as can commonly occur in high-performance computing networks—a given flow may be quiescent during the period following a rate decrease due to congestion. Several timer periods may elapse before transmission of the flow is resumed, with concomitant increases in the permitted transmission rate, even though no packets have actually been transmitted on the flow in question. If the flow then resumes transmission with a large burst of data, the communication device will restart its transmission suddenly at a high rate. A burst of this sort can lead to renewed congestion, followed by a forced reduction in transmission rate. This cycle may repeat multiple times on multiple flows, resulting in suboptimal use of the available network bandwidth.

Embodiments of the present invention that are described hereinbelow provide a congestion control mechanism that manages transmission resources with greater precision, using transmitted data volume, typically (although not necessarily) in conjunction with elapsed time, in determining permitted transmission rates. In the disclosed embodiments, after having reduced its rate of transmission following a congestion notification, the communication device increases its rate of transmission incrementally when a predefined volume of data has been transmitted and, in some embodiments, when a predefined time has passed, as well, since having made a previous change in the rate of transmission. In other words, referring to the InfiniBand example, expiration of the CCTI timer is not sufficient, in and of itself, to trigger a transmission rate increase. Rather, the rate will typically increase only after a certain volume of data has been transmitted since the last rate change. The present embodiments are thus useful in avoiding, or at least mitigating, the sorts of congestion scenarios that are described above, which may occur particularly in conditions of bursty traffic.

Assuming that, as in the InfiniBand model, the congestion notification refers to a specified flow of the data packets among multiple flows transmitted by the communication device, the rate control mechanism described above is also applied to each flow individually, based on the volume of data transmitted in each flow.

In the embodiments that are shown in the figures and described below in greater detail, the rate of transmission of the data packets is controlled by specifying a delay between successive packets transmitted by the communication device. Thus, reducing the rate of transmission corresponds to increasing the specified delay, and increasing the rate of transmission corresponds to decreasing the specified delay, in accordance with the InfiniBand model. The delay is determined by selecting an entry indicated by a pointer in a table of delay values, such as the CCT, so that the delay is increased by incrementing the pointer and decreased by decrementing the pointer when both the predefined time has passed and the predefined volume of data has been transmitted. The principles of the present invention, however, are not limited to InfiniBand networks or congestion control based on tables of delay values, and may alternatively be applied, mutatis mutandis, in other sorts of networks, such as Ethernet networks, that implement congestion control protocols.

FIG. 1 is block diagram that schematically illustrates a network communication system 20, in accordance with an embodiment of the invention. System 20 comprises multiple host computers 22, 24, 26, . . . , which are connected by a network 28, such as an InfiniBand switch fabric, comprising multiple interconnected switches 30. Each host computer comprises a central processing unit (CPU) 32 and a memory 34, which are connected to a network interface controller (NIC) 36 by a peripheral component bus, such as a PCIe bus.

NIC 36 comprises a host interface 38, which is connected to CPU 32 and memory 34 via the bus, and a network interface 40, which is connected to network 28. Packet processing circuitry 42 in NIC 36 is coupled between interfaces 38 and 40 so as to process incoming data packets that are delivered to computer 22 from network 28 and outgoing packets for transmission to the network. Typically, NIC 36 transmits and receives packets in multiple flows 44, wherein each such flow corresponds to a queue pair (QP) or service level on a given port of network interface 40. Alternatively, flows 44 may be defined in terms of other entities, such as Ethernet rings or IP tuples, for example.

Packet processing circuitry 42 comprises congestion control logic 46, which controls the respective rates of transmission of outgoing data packets on flows 44 to network 28. Although logic 46 is shown in FIG. 1, for the sake of conceptual clarity, as an independent functional block, in practice the functions of logic 46 are typically integrated with other packet processing functions of circuitry 42 in a single integrated circuit. Logic 46 may be implemented in this context by means of dedicated or programmable logic circuits or, additionally or alternatively, by software or firmware running on a programmable processor in NIC 22 or even on CPU 32. All such implementations are considered to be within the scope of the present invention. The remaining packet processing functions of circuitry 42 will be apparent to those skilled in the art and are omitted here for the sake of brevity.

The operation of congestion control logic 46 is based on a congestion control table (CCT) 48, which contains multiple entries, each specifying a delay between successive packets. For each flow 44, logic 46 maintains an index, pointing to the CCT entry that is currently applicable to the flow. In the InfiniBand context, incrementing the index causes it to point to a larger delay value (and thus a lower rate of packet transmission), and vice versa. This particular arrangement of table entries is arbitrary, however (although convenient), and any suitable mechanism that is known in the art may be used to keep track of and update the permitted data transmission rate for each flow.

In order to decide when and how to update the respective indices to CCT 48, congestion control logic 46 maintains a timer 50 and a data counter 52 for each flow 44. As explained above, upon receiving a congestion notification (such as a BECN) pertaining to a certain flow, logic 46 increments the corresponding CCT index. When the corresponding timer 50 indicates that a predefined time has passed since the last change in the transmission rate on a given flow 44, and the corresponding counter 52 indicates that a predefined volume of data has been transmitted since the last change, logic 46 decrements the CCT index. For this purpose, counter 52 maintains a count of the volume of data transmitted in the data packets on the flow since the previous change in the rate of transmission, and the rate of transmission is increased only after the count has reached a predefined threshold. Logic 46 resets both timer 50 and the count maintained by counter 52 after decrementing the CCT index for a given flow 44. The next increase in the rate of transmission on this flow will occur only when both timer 50 has again elapsed and counter 52 has again reached the predefined threshold.

Figure 2:
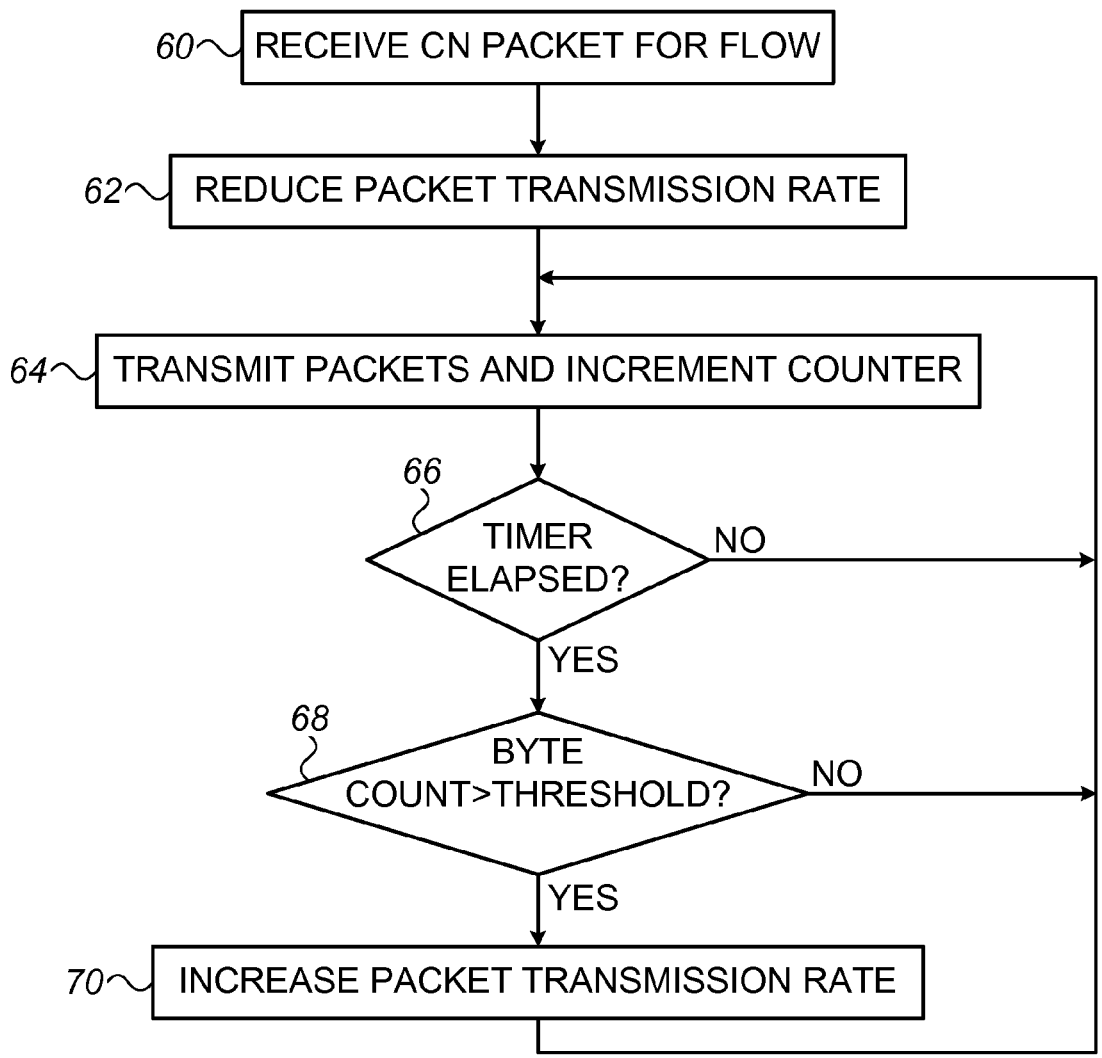
FIG. 2 is a flow chart that schematically illustrates a method for congestion control, in accordance with an embodiment of the invention.

FIG. 2 is a flow chart that schematically illustrates a method for congestion control, in accordance with an embodiment of the invention. The method is described hereinbelow, for the sake of convenience and clarity, with reference to the elements of system 20, and specifically NIC 36 (FIG. 1), but may alternatively be implemented in any suitable sort of NIC or other network communication device that is known in the art. Although the steps of the method of FIG. 2 are shown and described in a certain linear sequence for the sake of simplicity, in practice the decrease and increase of packet transmission rates go on continually, in varying order, in response to changing congestion conditions on network 28. The description below refers to a single flow 44, while the transmission rates of other flows are controlled in a similar manner by congestion control logic 46 concurrently, and generally asynchronously, with one another.

At the outset of the process shown in FIG. 2, NIC 36 receives a congestion notification (CN) packet, such as a data packet containing a BECN notification or a dedicated BECN packet, for the flow 44 of interest, at a congestion notification step 60. The notification may be received, for example, from one of computers 24 and 26 in response to forward congestion notifications generated by switches 30. In response to the notification received at step 60, congestion control logic 46 decreases the permitted transmission rate of the flow in question, typically by incrementing the corresponding index to CCT 48, at a rate reduction step 62.

Packet processing circuitry 42 continues transmission of packets on flow 44, while logic 46 limits the transmission rate to no more than the permitted rate that was set at step 62, at a packet transmission step 64. For each transmitted packet on flow 44, counter 52 counts the number of bytes transmitted and increments its count accordingly. Alternatively or additionally, counter 52 may accumulate other measures of data volume, such as counting the number of packets transmitted.

Congestion control logic 46 periodically checks the values of timers 50, at a timer checking step 66. When the timer has elapsed for a given flow 44, logic 46 checks the byte count (and/or other accumulated measure) in the corresponding counter 52, at a counter checking step 68. When the count has passed the applicable threshold, logic 46 increases the permitted transmission rate for this flow, typically by decrementing the CCT index, as explained above, at a rate increase step 70. Logic 46 resets the values of timer 50 and counter 52, and the process resumes at step 64 until the next rate increase (due to the timer elapsing and the count again reaching threshold at step 66 and 68) or decrease (due to reception of a further CN packet at step 60).

Figure 3:
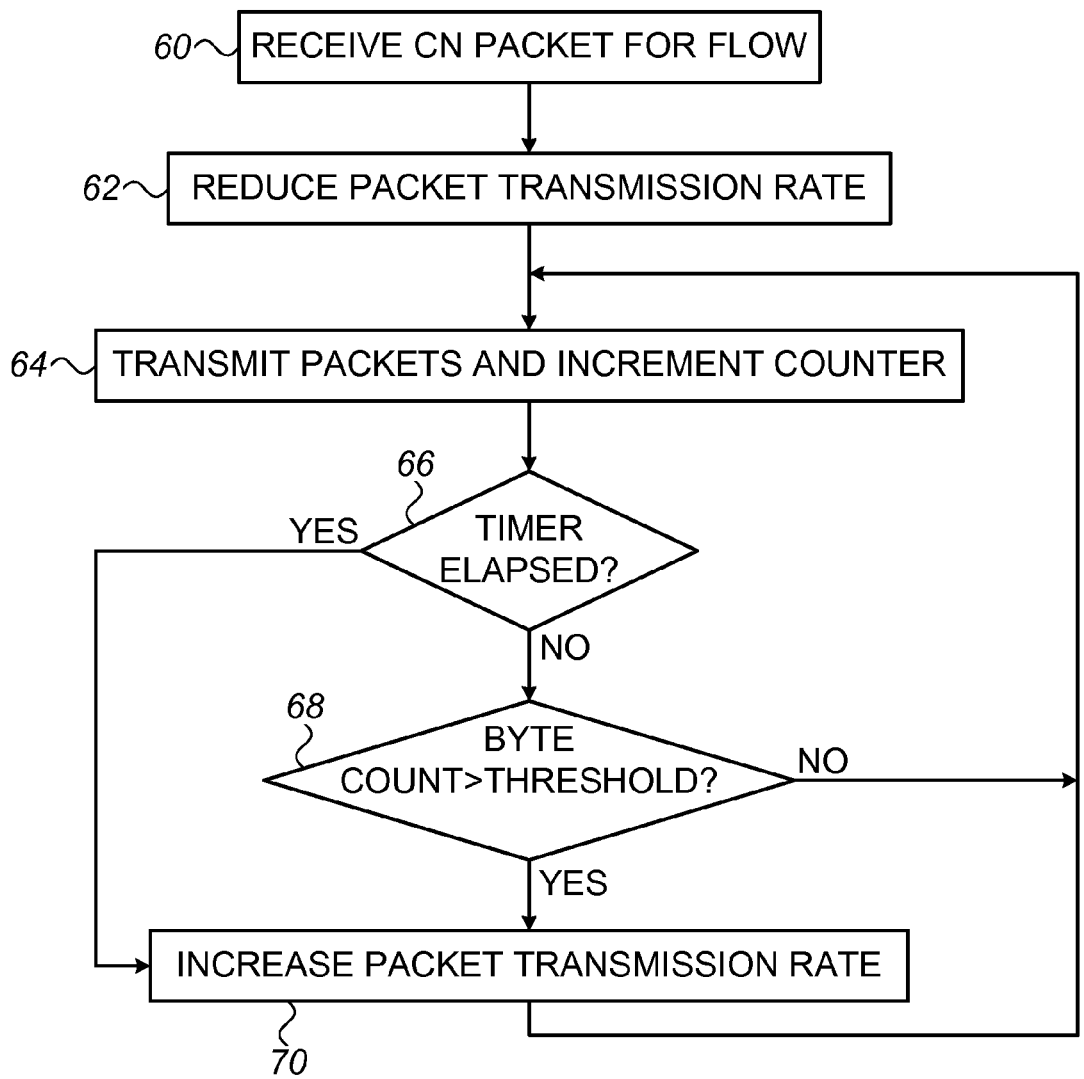
FIG. 3 is a flow chart that schematically illustrates a method for congestion control, in accordance with an alternative embodiment of the invention.

FIG. 3 is a flow chart that schematically illustrates a method for congestion control, in accordance with an alternative of the invention. The steps of this method are substantially the same as those of the method of FIG. 2 and are therefore marked with the same numbers. The embodiments differ, however, in that in the method of FIG. 3, congestion control circuitry 46 applies the requirements of timer checking step 66 and counter checking step 68 in the alternative, rather than as cumulative conditions for increasing the packet transmission rate at step 70. In other words, the packet transmission rate will be increased if either the timer has elapsed at step 66 or the byte count has passed the threshold at step 68. To reduce the likelihood of sudden bursts of packets, the timeout limit may be set to a high value. Optionally, the timeout limit may be set to infinity, so that only byte count is taken into account in deciding when to increase the transmission rate.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for communication, comprising:
    transmitting data packets from a communication device to a network, during a first time period, at a rate up to a current maximal permitted rate of transmission;
    receiving in the communication device a congestion notification from the network, following the transmission of the data packets during the first time period;
    reducing the current maximal permitted rate of transmission of the data packets from the communication device to the network in response to the congestion notification;
    transmitting further data packets, during a second time period, after reducing the current maximal permitted rate of transmission, at a rate up to the current reduced maximal permitted rate of transmission;
    maintaining a count of a volume of data in the transmitted data packets since a previous change in the current maximal permitted rate of transmission;
    periodically determining whether the maintained current count of the volume of data, since a previous change in the current maximal permitted rate of transmission, reached a predefined threshold; and
    increasing the current maximal permitted rate of transmission responsively to a determination that the current count of the volume of data in the transmitted data packets reached the predefined threshold.

2. The method according to claim 1, further comprising maintaining a timer for a time that passed since a previous change in the rate of transmission and wherein increasing the current maximal permitted rate of transmission comprises incrementing the current maximal permitted rate of transmission at times determined responsive to both the count of the volume of data and the time that passed as indicated by the timer.

3. The method of claim 2, wherein increasing the current maximal permitted rate of transmission comprises incrementing the current maximal permitted rate of transmission when a predefined time has passed, or the predefined volume of data has been transmitted, since having made the previous change in the current maximal permitted rate of transmission.

4. The method according to claim 1, wherein the communication device comprises a channel adapter, and wherein receiving the congestion notification comprises receiving a backward explicit congestion notification from a target of the transmitted data packets.

5. The method according to claim 1, wherein the congestion notification refers to a specified flow of the data packets, among a plurality of flows transmitted by the communication device, and wherein respective rates of transmission of the data packets on all of the plurality of the flows are reduced and increased respectively in accordance with the method.

6. The method according to claim 1, wherein transmitting the data packets comprises controlling the rate of transmission of the data packets by specifying a delay between successive packets transmitted by the communication device, such that reducing the rate of transmission comprises increasing the specified delay, and increasing the rate of transmission comprises decreasing the specified delay.

7. The method according to claim 6, wherein specifying the delay comprises selecting an entry indicated by a pointer in a table of delay values, and wherein increasing the specified delay comprises incrementing the pointer in response to the congestion notification, while decreasing the specified delay comprises decrementing the pointer when the count of volume of data that has been transmitted reached the predefined threshold.

8. The method according to claim 1, wherein maintaining the count comprises resetting the count after increasing the current maximal permitted rate of transmission, in preparation for a subsequent increase in the current maximal permitted rate of transmission when the count has again reached the predefined threshold.

9. The method according to claim 1, wherein maintaining a count of a volume of data in the transmitted data packets since a previous change in the rate of transmission comprises maintaining a separate count for each of a plurality of packet flows.

10. The method of claim 1, wherein increasing the current maximal permitted rate of transmission comprises incrementing the current maximal permitted rate of transmission only when a predefined time has passed, in addition to the predefined volume of data having been transmitted, since having made the previous change in the current maximal permitted rate of transmission.

11. The method according to claim 1, wherein maintaining a count of a volume of data comprises maintaining a count of a number of bytes transmitted.

12. The method according to claim 1, wherein maintaining a count of a volume of data comprises maintaining a count of a number of packets transmitted.

13. Communication apparatus, comprising:
a network interface, which is configured to transmit outgoing data packets to a network, at a rate up to a current maximal permitted rate of transmission and receive incoming data packets, including congestion notifications, from the network; and
packet processing circuitry, which is configured, to reduce the current maximal permitted rate of transmission in response to receiving congestion notifications through the network interface, to maintain a count of a volume of data in the transmitted data packets since a previous change in the current maximal permitted rate of transmission, to periodically determine whether the maintained current count of the volume of data reached a predefined threshold, and to increase the current maximal permitted rate of transmission incrementally, responsively to a determination that the current count of the volume of data in the transmitted data packets reached the predefined threshold.

14. The apparatus according to claim 13, wherein the packet processing circuitry is configured to maintain a timer for a time that passed since a previous change in the rate of transmission and to increment the current maximal permitted rate of transmission at times determined responsive to both the count of the volume of data and the time that passed as indicated by the timer.

15. The apparatus of claim 14, wherein the packet processing circuitry is configured to increment the current maximal permitted rate of transmission when a predefined time has passed, or the predefined volume of data has been transmitted, since having made the previous change in the current maximal permitted rate of transmission.

16. The apparatus according to claim 13, wherein the congestion notifications comprise backward explicit congestion notifications received from a target of the transmitted data packets.

17. The apparatus according to claim 13, wherein each of the congestion notifications refers to a specified flow of the data packets, among a plurality of flows transmitted through the network interface, and wherein the packet processing circuitry reduces and increases respective rates of transmission of the data packets on each of the plurality of the flows depending upon the time that has passed and the volume of data transmitted on each of the flows.

18. The apparatus according to claim 13, wherein the packet processing circuitry is configured to control the rate of transmission of the data packets by specifying a delay between successive packets transmitted by the communication device, such that reducing the rate of transmission comprises increasing the specified delay, and increasing the rate of transmission comprises decreasing the specified delay.

19. The apparatus according to claim 18, wherein the delay is specified by selecting an entry indicated by a pointer in a table of delay values, and wherein the specified delay is increased by incrementing the pointer in response to the congestion notification, and the specified delay is decreased by decrementing the pointer when the count of volume of data that has been transmitted reached the predefined threshold.

20. The apparatus according to claim 13, wherein the packet processing circuitry is configured to reset the count after increasing the current maximal permitted rate of transmission, in preparation for a subsequent increase in the current maximal permitted rate of transmission when the count has again reached the predefined threshold.

21. The apparatus according to claim 13, wherein the packet processing circuitry is configured to maintain a separate count for each of a plurality of packet flows.

22. The apparatus of claim 13, wherein the packet processing circuitry is configured to increment the current maximal permitted rate of transmission only when a predefined time has passed, in addition to the predefined volume of data having been transmitted, since having made the previous change in the current maximal permitted rate of transmission.

* * * * *